US012616188B2

(12) United States Patent
Zhang

(10) Patent No.: US 12,616,188 B2
(45) Date of Patent: May 5, 2026

(54) SQUIRREL-PROOF DEVICE

(71) Applicant: Netvue Technologies Co., Ltd.,
Shenzhen (CN)

(72) Inventor: Rui Zhang, Shenzhen (CN)

( * ) Notice: Subject to any disclaimer, the term of this
patent is extended or adjusted under 35
U.S.C. 154(b) by 195 days.

(21) Appl. No.: 18/392,681

(22) Filed: Dec. 21, 2023

(65) Prior Publication Data

US 2025/0057148 A1    Feb. 20, 2025

(30) Foreign Application Priority Data

Aug. 15, 2023    (CN) ......................... 202322214347.3

(51) Int. Cl.
    A01M 29/30        (2011.01)
(52) U.S. Cl.
    CPC ................................... A01M 29/30 (2013.01)
(58) Field of Classification Search
    CPC ..................................................... A01M 29/30
    See application file for complete search history.

(56) References Cited

U.S. PATENT DOCUMENTS

| | | | | |
|---|---|---|---|---|
| 2,856,898 A | * | 10/1958 | Doubleday | ........ A01K 39/0113 |
| | | | | 119/57.9 |
| 3,648,661 A | * | 3/1972 | Moore | ................. A01K 39/012 |
| | | | | 119/53 |
| 5,163,382 A | * | 11/1992 | Morrison | ........... A01K 39/0113 |
| | | | | 119/57.9 |

| | | | | |
|---|---|---|---|---|
| 5,195,459 A | * | 3/1993 | Ancketill | .............. C03C 14/002 |
| | | | | 119/52.3 |
| 5,394,641 A | * | 3/1995 | Danca | ................ A01K 39/0113 |
| | | | | 43/108 |
| 6,561,128 B1 | * | 5/2003 | Carter | ................ A01K 39/0113 |
| | | | | 119/52.3 |
| 6,640,746 B1 | * | 11/2003 | Lund | ................... A01K 39/0113 |
| | | | | 119/59 |
| 8,413,605 B2 | * | 4/2013 | Baynard | ............ A01K 39/0113 |
| | | | | 119/52.3 |
| 9,883,658 B2 | * | 2/2018 | Barr | ....................... A01M 29/24 |
| 11,185,054 B2 | * | 11/2021 | Cote | ....................... A01K 39/01 |
| 2002/0139311 A1 | * | 10/2002 | Cote | ................. A01K 39/0113 |
| | | | | 119/57.9 |
| 2003/0009957 A1 | * | 1/2003 | Wulff | ..................... A01G 13/10 |
| | | | | 52/101 |
| 2003/0033985 A1 | * | 2/2003 | Hardison | ............... A01K 39/00 |
| | | | | 119/57.9 |

(Continued)

*Primary Examiner* — Joshua K Ihezie

(57)    ABSTRACT

The present utility model relates to a squirrel-proof device
set on a supporting rod, comprising housing and connecting
parts set between the housing and the supporting rod;
wherein the connecting parts enable the housing to move
upward along the supporting rod when the housing is
exerted a downward force; the first housing is arranged
above the second housing, the first and/or the second hous-
ing is connected to the supporting rod through the connect-
ing parts; the second housing comprises an inverted circular
table bottom housing or an arc bottom housing with diam-
eter decreased from up to down, and the top of the second
housing is connected to the bottom of the first housing. The
utility model forms a squirrel-proof device that can move
vertically and/or rotate, and when squirrels climb over the
housing, they are affected by the downward and outward
centripetal force, and cannot maintain balance and grip.

8 Claims, 2 Drawing Sheets

(56)  References Cited

U.S. PATENT DOCUMENTS

| 2012/0067295 | A1* | 3/2012  | Muckala   | ............ | A01K 39/0113 |
| | | | | | 119/712 |
| 2015/0173329 | A1* | 6/2015  | Barr      | .................. | A01K 39/0113 |
| | | | | | 119/52.3 |
| 2020/0253166 | A1* | 8/2020  | Cote      | .................. | A01K 39/0113 |
| 2021/0329907 | A1* | 10/2021 | Juenemann | .......... | A01M 29/30 |
| 2023/0309516 | A1* | 10/2023 | Beckman   | .......... | A01K 39/0113 |
| | | | | | 119/57.9 |

* cited by examiner

SQUIRREL-PROOF DEVICE

TECHNICAL FIELD

The present utility model relates to a squirrel-proof device. More specifically, the present utility model is directed to a type of device set on the supporting rod for preventing encroachment on bird's nest or other objects from squirrels and other reptile animals.

BACKGROUND

The nests where the birds inhabit and breed are important and significant for their survival and protection. However, their nests are often encroached by squirrels and other reptile animals who may climb onto the supporting rods or tree branches to eat bird eggs or young birds, or even damage the structure of the nests. This gives rise to serious hazards to birds.

To protect bird's nest from attack from squirrels and other reptile animals, some guard devices have been proposed at present. For example, a device for preventing encroachment from squirrels to the bird's nest is disclosed, comprising an inverted conical housing and an electric motor fixed inside the housing. When any squirrel contacts the housing, the motor will drive the housing to rotate, leading to loss of balance and holding power of the squirrel and thereby reaching the purpose of repelling squirrels. However, such device has deficiencies as follows:

the device needs power supply and control circuit, which may increase its costs and complexity;

the device may cause harm to or trouble the birds, influencing their normal flight and habitat;

the device may be failed due to motor fault or housing damage.

Therefore, the present utility model aims to provide a simple, effective, safe, environmental squirrel-proof device to solve aforesaid problems.

SUMMARY

The present utility model aims to provide a squirrel-proof device, set on the supporting rod, for preventing encroachment on bird's nest or other objects from squirrels.

To reach aforesaid purposes, the present utility model employs the following technical schemes:

a squirrel-proof device, set on a supporting rod, comprising:

housing;

connecting parts, set between the housing and the supporting rod;

wherein, the connecting parts are used for driving the housing to have the trend of moving upwards along the supporting rod when the housing is applied with the downward force;

the housing consists of a first housing and a second housing, wherein the first housing is set at the top of the second housing, the first and/or second housing is connected to the supporting rod through the connecting parts, the second housing consists of an inverted circular table shaped bottom housing or an arc shaped bottom housing with diameter gradually decreased from up to down, and the top of the second housing is connected to the bottom of the first housing;

further, the first housing is a circular table or an arc shaped housing with diameter gradually increased from up to down;

further, the second housing also includes an inverted circular table shaped top housing with diameter gradually increased from down to up or an arc shaped top housing with diameter gradually decreased from down to up;

further, the connecting parts include a fixed base, a spring and a connecting base, wherein the fixed base is set on the supporting rod, the spring is nested on the supporting rod, the bottom of the spring is connected to the fixed base, the top of the spring is connected to the connecting base, the connecting base can be flexibly connected to the supporting rod, and the connecting base is connected to the housing;

further, the top of the first housing is set with a first through hole, the first housing can be flexibly nested on the supporting rod through the first through hole, the diameter of the first through hole is smaller than the outer diameter of the connecting base, and the top of the connecting base is connected against or fixedly to the top of the first housing.

further, the bottom of the second housing is set with a second through hole, and the diameter of the second through hole is larger than the supporting rod.

further, the diameter of the second through hole is three times of the supporting rod.

further, the housing has a length 40 to 50 cm.

further, the spring has a wire diameter 1.5 to 3 mm.

further, the spring has a precompression 20% to 50%.

Beneficial Effects of the Present Utility Mode

The utility model employs the combination of inverted circular table or arc shaped housing and the connecting parts to form a guard device that can move up and down and/or rotate. When squirrels attempt to climb over the housing, they will get the action of downward and outward centripetal force and cannot keep balance and their holding power, thereby reaching the purpose of repelling squirrels.

This utility model does not need any power supply or control circuit, which simplifies the structure, reduces costs, improves reliability and environmental protection.

MARKS ON THE DRAWINGS

100. Supporting rod; 210. The first housing; 220. The second housing; 310. Fixed base; 320. Spring; 330. Connecting base.

Embodiments

To more clearly present the purpose, technical proposal and advantages, the utility model of a squirrel-proof device is further described combined with the drawings and embodiments. It is understood that the embodiments are described for explaining instead of limiting this utility model only.

In description of the utility model, unless otherwise stated, the "multiple" means two or above; the terms such as "center", "longitudinal", "horizontal", "up", "down", "left", "right", "internal", "external", "front", "rear", "head", "tail", "vertical", "level", "top", "bottom", "internal", "external" indicate the azimuth or position relation which is based on the drawings. They are only used for describing the utility model and simplifying the description, other than indicating or implying that the referred device or element must have specific azimuth or constructed and operated from specific azimuth. Therefore, they cannot be interpreted as limitations for the utility model. In addition, the terms such as "first", "second" and "third" are only used for the descriptive purposes and cannot be interpreted to indicate or imply the relative importance.

In description of the utility model, unless otherwise specified and limited, it is noted that the terms "installation", "connect" and "connection" are generalized, for example, fixed connection, removable connection or integrated connection; mechanical connection or electrical connection; direct connection, indirect connection through medium, or internal connection between two elements. For common technicians of this field, the detailed meanings of the aforesaid terms in this utility model can be understood according to actual conditions.

Figure 1:
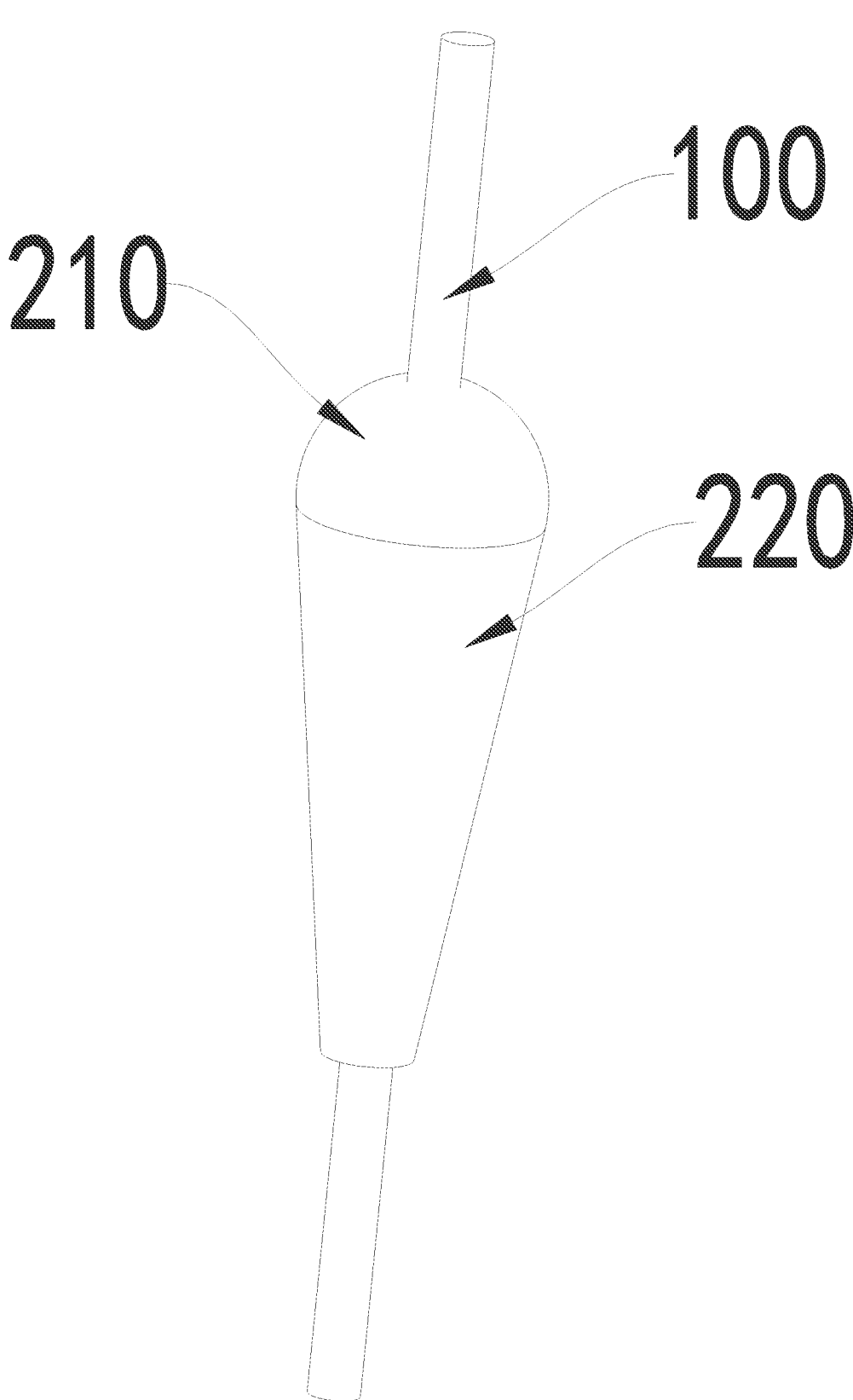
FIG. 1 is the structural diagram of the squirrel-proof device in the embodiments of the present utility model.
Figure 2:
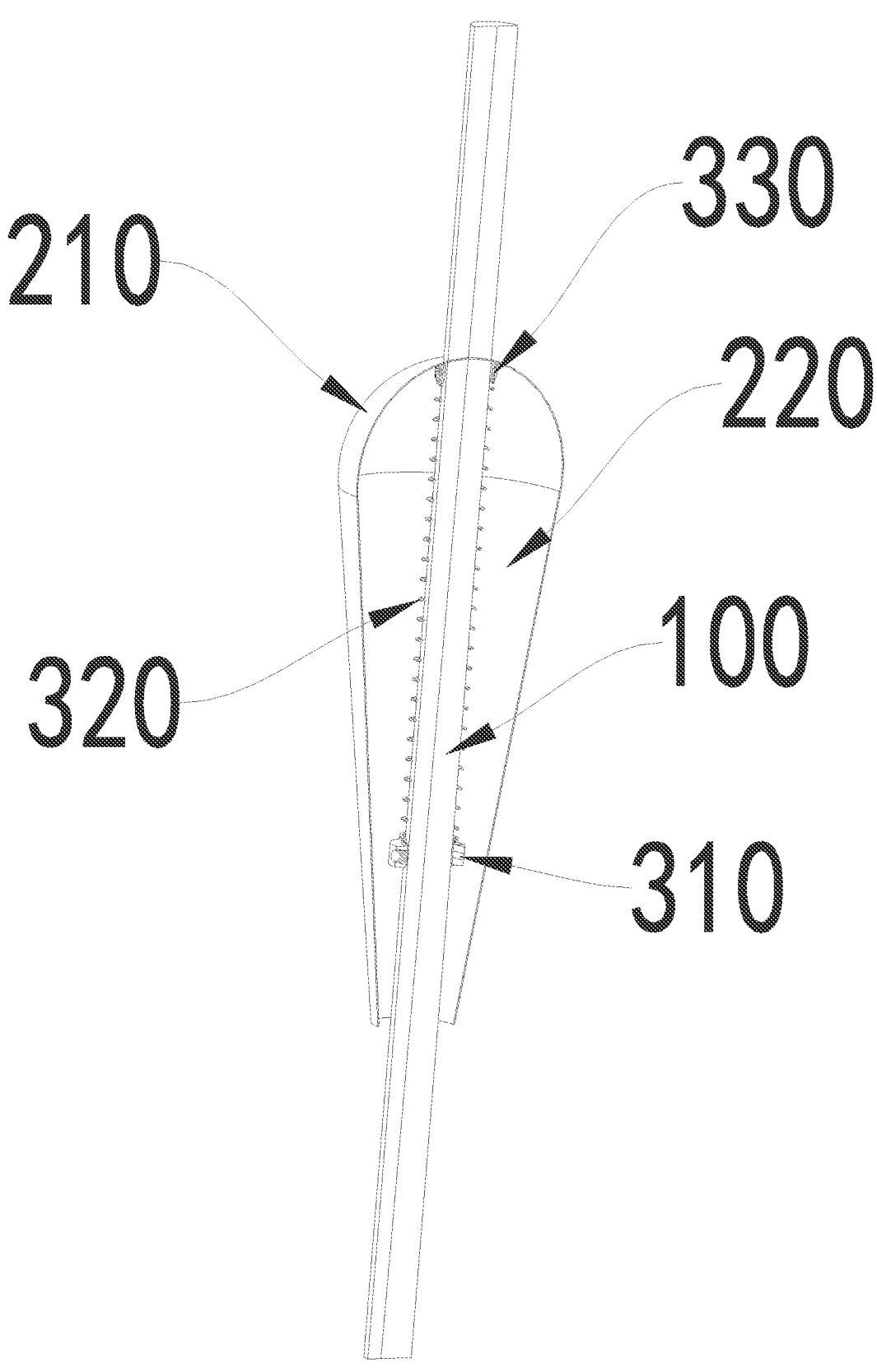
FIG. 2 is the profile diagram of the squirrel-proof device along any radial direction of the support rod in the embodiments of the present utility model.

See FIG. 1 & FIG. 2. The embodiments of the present utility model provide a squirrel-proof device set on the supporting rod 100 for preventing encroachment on the bird's nest or other objects from squirrels. The device comprises:

housing;

connecting parts, set between the housing and the supporting rod 100;

wherein, the connecting parts are used for driving the housing to have the trend of moving upwards along the supporting rod 100 when the housing is applied with the downward force;

the housing consists of a first housing 210 and a second housing 220, wherein the first housing 210 is set at the top of the second housing 220, the first housing 210 and/or the second housing 220 is connected to the supporting rod 100 through the connecting parts, the second housing 220 consists of an inverted circular table shaped bottom housing or an arc shaped bottom housing with diameter gradually decreased from up to down, and the top of the second housing 220 is connected to the bottom of the first housing 210.

In this embodiment, the utility model employs the combination of inverted circular table or arc shaped housing and the connecting parts to form a guard device that can move up and down and/or rotate. When squirrels attempt to climb over the housing, they will get the action of downward and outward centripetal force and cannot keep balance and their holding power, thereby reaching the purpose of repelling squirrels.

The present utility model does not any need power supply or control circuit, which simplifies the structure, reduces costs, improves reliability and environmental protection.

The second housing 220 is set into inverted circular table or arc shape with diameter gradually decreased from top to down, in order to make it harder for squirrels and other animals to climb up.

In one embodiment, the first housing 210 is a circular table shaped housing with diameter gradually increased from top to bottom, of which the top diameter is smaller than the bottom diameter to form a downward opening. As a result, the housing forms a shape with a small diameter at both ends and a large diameter in the middle, which further makes it harder for squirrels and other animals to climb up.

In one embodiment, the top of the first housing 210 is set with a first through hole of which the diameter is larger than or equal to the diameter of the supporting rod 100, so that the first housing 210 can be flexibly nested on the supporting rod 100 through the first through hole. The bottom of the first housing 210 is connected to the top of the second housing 220.

In one embodiment, the second housing 220 is an inverted circular table shaped bottom housing with diameter gradually decreased from top to bottom, of which the top diameter is larger than the bottom diameter to form an upward opening. The bottom of this inverted circular table shaped bottom housing is set with a second through hole of which the diameter is larger than the diameter of the supporting rod 100, so that the inverted circular table shaped bottom housing can be flexibly nested on the supporting rod 100 through this second through hole. The top of the inverted circular table shaped bottom housing is connected to the bottom of the first housing 210.

In one embodiment, the connecting parts consist of a fixed base 310, a spring 320 and a connecting base 330, where the fixed base 310 is set on and fixedly connected to the supporting rod 100. The spring 320 is nested on and can be flexibly combined with said supporting rod 100. The bottom of the spring 320 is connected to and limited by said fixing base 310. The top of the spring 320 is connected to said connecting base 330 and applied with upward elastic force. The connecting base 330 is flexibly connected to and can relatively slid against the supporting rod 100. The connecting base 330 is connected to the housing and fixed to a relative position.

In one embodiment, the connecting base 330 is connected against or fixedly to the top of the first housing 210 and limited to a highest position. When squirrels and other reptiles attempt to climb over the second housing 220, they will get the action of downward and outward centripetal force (if the top of the spring 320 is fixedly connected to the first housing 210, the compressed spring 320 may cause rotation to a certain extent and further drive rotation of the first housing 210, as a result, the whole housing will rotate to a certain angle), making it hard for them to keep balance and holding power. Due to the certain gap between the second housing 220 and the supporting rod 100, when squirrels and other reptiles apply a downward force, the second housing 220 will move downwards along the supporting rod 100 and drive the first housing 210 and the connecting base 330 to move downwards, thereby compressing the spring 320. When squirrels and other reptiles loosen the second housing 220, the spring 320 will recover to its original condition and drive the second housing 220, the first housing 210 and the connecting base 330 upwards to form an upward impact force on the second housing 220 and to further throw squirrels and other reptiles down.

If the top of the first housing 210 is fixedly connected to the connecting base 330, the first housing 210 will be limited by the connecting base 330 when reaching the highest position, in order to avoid collision with the bird's nest or other objects.

Compared to the fixed connection, the connection relationship of the contact may cause shaking of the first housing 210, which can also repel squirrels and other animals from climbing up to a certain extent. This can be selected according to actual conditions.

In one embodiment, the housing has a length 40 cm, the spring 320 has a wire diameter 2 mm, and the spring 320 has a precompression 30%. These parameters can be adjusted and changed according to different supporting rod 100 and the size and weight of the bird's nest or other objects.

The working principle of this utility model is described as follows:

When reptiles such as squirrels attempt to climb the inverted conical or arch shaped housing, they will get the action of the following force:

Gravity: The downward force will be generated due to the weight of any squirrel;

Force of friction: The force that is opposed to the direction of motion will be generated between any squirrel and the housing;

Normal force: The housing will apply the force that is perpendicular to the housing surface to any squirrel;

Elastic force: The spring 320 will apply the upward force to the housing.

The surface of the inverted conical or arc shaped housing is slant or incurved, so that the normal force will be decomposed into two components, of which one is the component Fn1 perpendicular to the supporting rod 100 and the other is the component Fn2 along the supporting rod 100. Fn1 will offset partial gravity, while Fn2 can increase the force of friction. Furthermore, the inverted conical or arc shaped housing can be moved up and down or rotated, when squirrels apply downward force, the housing will move down along the supporting rod 100 and drive the spring 320 to compress. When squirrels loosen the housing, the spring 320 will recover to its original condition, drive the housing to move upwards and the housing to rotate. In this way, squirrels will be affected as follows:

losing balance: it is difficult for squirrels to find a stable supporting point, because the inverted conical or arc shaped housing is slant or incurved and can rotate.

losing holding power: it is difficult for squirrels to have enough force of friction, because the surface of the inverted conical or arc shaped housing is smooth and can move up and down.

to be thrown off: squirrels will be bounced off or thrown off, because the inverted conical or arc shaped housing can generate upward impact.

In this way, squirrels will give up attacking the bird's nest or other objects, thereby reaching the purpose of repelling squirrels.

In one embodiment, the first housing 210 is arch shaped rather than a circular table shaped housing. Both the top and bottom of the arc shaped housing are semicircular to form a downward opening. The top of the arc shaped housing is set with a first through hole of which the diameter is larger than the diameter of the supporting rod 100, so that the arc shaped housing can be flexibly nested on the supporting rod 100 through the first through hole. The bottom of the arc shaped housing is connected to the top of the second housing 220.

In one embodiment, the second housing 220 also includes a circular table shaped top housing with diameter gradually increased from down to up, not just being an inverted circular table shaped bottom housing. The bottom diameter of the inverted circular table shaped top housing is smaller than the top diameter, forming an upward opening. The bottom of the inverted circular table shaped top housing is connected to the top of the inverted circular table shaped bottom housing, of which both constitute the second housing 220. The top of the inverted circular table shaped top housing is connected to the bottom of the first housing 210.

In one embodiment, the second housing 220 also includes an arc shaped top housing with diameter gradually decreased from down to up, not just being an inverted circular table shaped bottom housing. Both the bottom and top of the arc shaped top housing are semicircular, forming an upward opening. The bottom of the arc shaped top housing is connected to the top of the inverted circular table shaped bottom housing, of which both constitute the second housing 220. The top of the arc shaped top housing is connected to the bottom of the first housing 210.

In one embodiment, the diameter of the second housing is three times of the supporting rod 100, not just being larger than the diameter of the supporting rod 100. This can increase the gap between the inverted conical or arc shaped housing and the supporting rod 100. As a result, the degree of impact from downward movement and rotation on squirrels will increase, while the shaking range of the second housing 220 will be greater.

In one embodiment, the housing has the length 50 cm rather than 40 cm, which can increase length of the inverted conical or arc shaped housing. As a result, the degree of the downward and outward force applied to squirrels will increase.

In one embodiment, the spring 320 has a wire diameter 1.5 mm rather than 2 mm, which can decrease rigidity of the spring 320, in order to increase the amount of compression and recovery of the spring 320 and increase the degree of upward impact of the inverted conical or arc shaped housing on squirrels.

In one embodiment, the spring 320 has a wire diameter 3 mm rather than 2 mm, which can increase rigidity of the spring 320, in order to decrease the amount of compression and recovery of the spring 320 and reduce the degree of upward impact of the inverted conical or arc shaped housing on squirrels.

In one embodiment, the spring 320 has a precompression 20% rather than 30%, which can decrease the initial upward thrust to the inverted conical or arc shaped housing, in order to decrease the influences of inverted conical or arc shaped housing on the bird's nest or other objects when the connecting base 330 and the first housing 210 are not fixedly connected.

In one embodiment, the spring 320 has a precompression 50% rather than 30%, which can increase the initial upward thrust to the inverted conical or arc shaped housing, in order to increase the impact force of inverted conical or arc shaped housing on squirrels.

The above are only particular embodiments of the present utility model, it is not intended to limit the scope of the utility model to the particular forms set forth. Numerous variations and modifications are of course possible, within the scope thereof. For example, the first housing 210 and the second housing 220 can be made by other applicable materials and colors to meet different environments and demands;

the first housing 210 and the second housing 220 can be made into other applicable shapes and sizes to accommodate different supporting rods 100 and the bird's nest or other objects;

the connecting parts can be connected to the housing and the supporting rod 100 through other applicable structures and modes to realize up and down movement and rotation functions of the housing;

the spring 320 can be replaced by other applicable elastic elements to realize up and down impact function of the housing;

the housing can be applied with some pepper spray or other substances for repelling squirrels in order to enhance the sense of discomfort or fear of such animals;

the housing can be set with some spikes or other sharp objects on its surface to increase the sense of pain or harm to squirrels;

the housing can be set with some electrodes or other electrical elements on its surface to apply the electric shock or current in order to increase the sense of scare or numbness to squirrels;

the housing can be set with some sounders or other audio elements on its surface to send noise or warning signals in order to increase the sense of disturbance or vigilance to squirrels;

the housing can be set with some light sources or other optical elements to send some flashing signals or signal indicators in order to increase the sense of dizziness or induction to squirrels;

the housing can be set with some odor devices or other odor elements on its surface to emit the undesirable odor or pheromone in order to increase the sense of disgust or attraction to squirrels.

It will be appreciated by persons skilled in the art that the disclosed technique is not limited to what has been particularly shown and described hereinabove; but on the contrary, it is intended to cover such alternatives, modifications and equivalents of the structures and technical processes contained herein, without departing from the spirit and scope thereof.

What is claimed is:

1. A squirrel-proof device set on a supporting rod comprising:

a housing;

connecting parts, set between the housing and the supporting rod;

wherein, the connecting parts are used for driving the housing to have a trend of moving upwards along the supporting rod when the housing is applied with a downward force;

the housing consists of a first housing and a second housing, wherein the first housing is set at a top of the second housing, the first and/or second housing is connected to the supporting rod through the connecting parts, the second housing is an inverted truncated cone shaped bottom housing having a diameter, with the diameter gradually decreased from up to down, and the top of the second housing is connected to a bottom of the first housing;

the connecting parts include a connecting base, the connecting base is capable of being flexibly connected to the supporting rod, and the connecting base is connected to the housing;

a top of the first housing is set with a first through hole, the first housing is capable of being flexibly nested on the supporting rod through the first through hole, a diameter of the first through hole is smaller than an outer diameter of the connecting base, and a top of the connecting base is connected against or fixedly to the top of the first housing.

2. The squirrel-proof device of claim 1, wherein the first housing is an arc shaped housing with it's diameter gradually increased from up to down.

3. The squirrel-proof device of claim 1, wherein the connecting parts include a fixed base and a spring, wherein the fixed base is set on the supporting rod, the spring is nested on the supporting rod, the bottom of the spring is connected to the fixed base, the top of the spring is connected to the connecting base.

4. The squirrel-proof device of claim 1, wherein the bottom of the second housing is set with a second through hole, and the diameter of the second through hole is larger than the supporting rod.

5. The squirrel-proof device of claim 4, wherein the diameter of the second through hole is three times of the supporting rod.

6. The squirrel-proof device of claim 3, wherein the housing has a length of 40 to 50 cm.

7. The squirrel-proof device of claim 6, wherein the spring has a wire diameter of 1.5 to 3 mm.

8. The squirrel-proof device of claim 7, wherein the spring has a precompression of 20% to 50%.

* * * * *